Patented Nov. 14, 1950

2,529,527

UNITED STATES PATENT OFFICE 2,529,527

COPPER COMPLEX COMPOUNDS OF SUBSTANTIVE AZO DYESTUFFS AND A PROCESS OF MAKING SAME

Walter Wehrli and Ernst Iselin, Basel, Switzerland, assignors to Sandoz Limited, Basel, Switzerland No Drawing. Application December 11, 1947, Serial No. 791,170. In Switzerland December 13, 1946

14 Claims. (Cl. 260—146)

1

The present invention relates to new copper-containing substantive azo dyestuffs and to a process for their manufacture.

We have found that valuable copper-containing azo dyestuffs can be prepared by coupling 1 molecule of a tetrazotized 3.3'-dialkoxy-4.4'-diaminodiphenyl with 1 molecule of a hydroxynaphthalene sulfonic acid and with 1 molecule of an azine of the formula

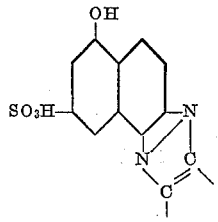

wherein >C=C< is a portion of an aryl residue, and treating the dyestuffs thus obtained with copper-yielding substances.

The new copper-containing dyestuffs dye cotton and regenerated cellulose in blue to blue-grey shades of outstanding fastness to light, washing and water and possess a very good power of exhaustion.

The preparation of the azo dyestuffs which are to be transformed into the copper compounds takes place advantageously in an alkaline medium, according to the usual methods of coupling, in which either the hydroxynaphthalene sulfonic acid or the azine is coupled in the first instance with the tetrazotized 3.3'-dialkoxy-4.4'-diaminodiphenyl.

As 3.3'-dialkoxy-4.4'-diaminodiphenyls there come particularly into consideration the 3.3'-dimethoxy- or 3.3'-diethoxy-4.4'-diaminodiphenyls.

The addition of pyridine bases has a favourable action both in the coupling and also in the coppering.

All the sulfonic acids of 1- or 2-hydroxynaphthalene which are capable of coupling are suitable for use as the hydroxynaphthalene sulfonic acids according to the invention, examples being 1 - hydroxynaphthalene - 3.6.8 - trisulfonic acid
1-hydroxynaphthalene-3.8-disulfonic acid
1-hydroxynaphthalene-3.6-disulfonic acid
1-hydroxynaphthalene-4.8-disulfonic acid
1-hydroxynaphthalene-3-sulfonic acid
1-hydroxynaphthalene-4-sulfonic acid
1-hydroxynaphthalene-5-sulfonic acid
2 - hydroxynaphthalene - 3.6 - disulphonic acid
2-hydroxynaphthalene-4-sulfonic acid
2-hydroxynaphthalene-6-sulfonic acid Sulfonic acids of dihydroxy naphthalenes such as 1.8-dihydroxynaphthalene-3.6-disulfonic acid are also suitable coupling components.

2

Suitable azines are for example 2-sulfo-4-hydroxy-α.β-naphthophenazine
2-sulfo-4-hydroxy-α.β-naphtho-10 - methylphenazine
2-sulfo-4-hydroxy - α.β - naphtho - 10 - methoxyphenazine
2-sulfo-4-hydroxy-α.β-naphtho-10-carboxyphenazine
5.5'-dihydroxy-7.7'-disulfo- 1.1'.2'.2 - dinaphthazine
5.5'-dihydroxy-7.7'-disulfo- 1.2.2'.1' - dinaphthazine, the preparation of which is in part described in French patent No. 679,164. The azines which can be prepared from 1.2-diamino-5-hydroxy-naphthalene-7-sulfonic acid by condensation with ortho-diketones such as phenanthrenequinone, also come into consideration.

The conversion into the copper complexes can take place according to known methods which bring about complete or far-reaching splitting off of the alkoxy groups in the radical of the 3.3'-dialkoxy-4.4'-diaminodiphenyl, as for example heating with an ammoniacal solution of a copper salt.

The dyestuffs which have not yet been coppered are also suitable for dyeing cotton and regenerated cellulose. The dyeings thus obtained are greatly improved in their fastness to light by after-treatment with copper salts on the fibre.

The following examples, without being limitative, illustrate the present invention, the parts being by weight.

Example 1

24.4 parts of dianisidine are tetrazotized as usual and coupled with ice cooling with 30.4 parts of 1-hydroxynaphthalene-4.8-disulfonic acid in the presence of sodium carbonate. When the intermediate compound has been formed, an alkaline solution of the sodium salt from 32.6 parts of the 2-sulfonic acid of 4-hydroxy-α.β-naphthophenazine is added. To facilitate the coupling, 5-10% by volume of a mixture of pyridine bases can be added. The dyestuff is isolated after the coupling is finished. It is soluble in water with a reddish-blue shade and in concentrated sulfuric acid with a grey-blue color.

For conversion into the copper compound 96.2 parts of the dyestuff are dissolved in 3000 parts of water and 20 parts of sodium carbonate. 500 parts of an ammoniacal copper oxide solution containing 50 parts of crystallized copper sulfate and 85 parts of concentrated aqueous ammonia are added gradually with stirring at 80–90° C. It is stirred for 5 hours at 90° C. and then boiled under a reflux condenser for 18 hours. The copper complex formed is isolated, filtered and dried. It dyes cotton and regenerated cellulose in blue-grey shades of very good fastness to light and to washing.

For the conversion of the metal-free disazo dyestuff into the copper complex compound the above given conditions can be varied within wide limits.

If instead of the 1-hydroxynaphthalene-4.8-disulfonic acid there is used the same quantity of 1-hydroxynaphthalene-3.6-disulfonic acid a dyestuff of slightly greener blue-grey shades of excellent fastness to light is obtained. Similar dyestuffs are obtained by the use of 1-hydroxynaphthalene-3.8-disulfonic acid and 2-hydroxynaphthalene-3.6-disulfonic acid.

*Example 2*

24.4 parts of dianisidine are tetrazotized as usual and coupled with ice cooling in the presence of sodium carbonate with 38.4 parts of 1-hydroxynaphthalene-3.6.8-trisulfonic acid. After formation of the intermediate compound has ensued an alkaline solution of the sodium salt from 32.6 parts of the 2-sulfonic acid of 4-hydroxy-α.β-naphtho phenazine is added. It is stirred at 25–30° C. in the presence of 5% by volume of pyridine until the dyestuff formation is complete. The dyestuff is then isolated. It dissolves in water with a greenish-blue shade and in concentrated sulfuric acid with a green shade. It dyes regenerated cellulose fibres in greenish-grey-blue shades which by after-coppering on the fibre undergo hardly any change in shade, but have their fastness to light very much improved.

For conversion into the copper compound 106.4 parts of the dyestuff are dissolved in 2000 parts of water and 20 parts sodium carbonate. 500 parts of ammoniacal copper oxide solution containing 50 parts crystallized copper sulfate and 85 parts of concentrated aqueous ammonia are added gradually with stirring at about 90° C. It is then boiled and the boiling continued under a reflux for about 15 hours. The copper complex formed is isolated, filtered and dried.

It dyes cotton and cellulose in bright greenish-blue shades of excellent fastness to light and washing.

In the conversion of the metal-free disazo dyestuff into the copper complex compound the conditions given above can be altered within wide limits.

If instead of 32.6 parts of the 2-sulfonic acid of 4-hydroxy-α.β-naphthophenazine there are used 35.6 parts of the 2-sulfonic acid of 4-hydroxy-α.β-naphtho-10-methoxy-phenazine or 37 parts of the 2-sulfonic acid of 4-hydroxy-α.β-naphtho-10-ethoxy-phenazine, there are obtained somewhat brighter dyestuffs of a very similar shade. By the use of 34 parts of the 2-sulfonic acid of 4-hydroxy-α.β-naphtho-10 - methylphenazine or 35.4 parts of the 2-sulfonic acid of 4-hydroxy-α.β-naphtho-8.11-dimethylphenazine or 37 parts of the 2-sulfonic acid of 4-hydroxy-α.β-naphtho-10-carboxyphenazine similar dyestuffs are obtained.

If in this example 27 parts of 3.3'-diethoxy-4.4'-diaminodiphenyl are used instead of 24.4 parts of dianisidine there is obtained a dyestuff of the same properties.

*Example 3*

24.4 parts of dianisidine are tetrazotized as usual and coupled with ice cooling with 32 parts of 1.8-dihydroxynaphthalene-3.6-disulfonic acid in the presence of sodium carbonate. After the intermediate compound is formed, an alkaline solution of the sodium salt from 32.6 parts of the 2-sulfonic acid of 4-hydroxy-α.β-naphthophenazine is added. It is stirred at 30° C. in the presence of 10% by volume of pyridine until the formation of the dyestuff is completed. The dyestuff is then isolated. It dissolves in water with a greenish-blue and in concentrated sulfuric acid with a greenish-grey-blue color.

The same dyestuff is obtained if the tetrazotised dianisidine is first coupled with the 2-sulfonic acid of 4-hydroxy-α.β-naphthophenazine and then with the 1.8-dihydroxynaphthalene-3.6-disulfonic acid.

For conversion into the copper complex 97.8 parts of the dyestuff are dissolved in 3000 parts of water and 20 parts of sodium carbonate. 500 parts of ammoniacal copper oxide solution containing 50 parts crystallised copped sulfate and 85 parts of concentrated aqueous ammonia solution are added gradually with stirring at 90° C. It is stirred for 5 hours at 90° C. and then brought to the boil and boiled for 18 hours under a reflux. The copper complex formed is isolated, filtered and dried.

It dyes cotton and cellulose in greenish-blue-grey shades of good fastness to washing and outstanding fastness to light.

Instead of 32.6 parts of the 2-sulfonic acid of 4-hydroxy-α.β-naphthophenazine, 38.6 parts of the 2-sulfonic acid of 4.10-dihydroxy-α.β-naphthophenazine-9- or -11-carboxylic acid can be used. This compound is obtained for example from an azo dyestuff of the formula

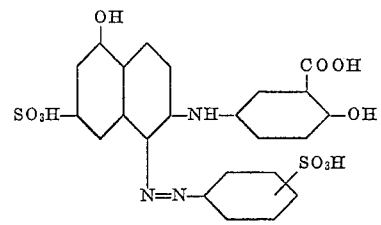

by treatment with acids.

*Example 4*

24.4 parts of dianisidine are tetrazotized as usual and coupled with ice cooling in the presence of sodium carbonate with 38.4 parts of 1-hydroxynaphthalene-3.6.8-trisulfonic acid. After formation of the intermediate compound has ensued, an alkaline solution of 42.6 parts of the compound of the formula is added. This last-

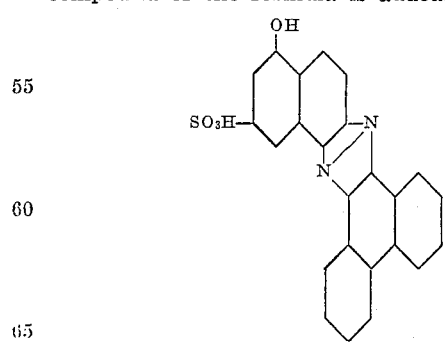

named substance can for example be obtained by condensation of 1.2-diamino-5-hydroxynaphthalene-7-sulfonic acid with phenanthrenequinone. The product is stirred at 15-20° C. with 7% by volume of pyridine until the formation of the dyestuff is complete. The dyestuff is then isolated. It dissolves in water with a greenish-blue shade and in concentrated sulfuric acid with a greenish-blue-grey color.

For conversion into the copper complex 116.4 parts of the dyestuff are dissolved in 2500 parts of water and 20 parts of sodium carbonate. 500 parts of an ammoniacal copper oxide solution containing 50 parts of crystallized copper sulfate and 85 parts of concentrated aqueous ammonia are added gradually with stirring at 90° C. It is stirred for 5 hours at 90° C., brought to the boil and boiled with stirring under a reflux for about 18 hours. The copper complex formed is separated, filtered and dried. It dyes cotton and regenerated cellulose in bright greenish-blue shades with outstanding fastness to light and to washing.

*Example 5*

24.4 parts of dianisidine are tetrazotized as usual and coupled with ice cooling in the presence of sodium carbonate with 38.4 parts of 1-hydroxynaphthalene-3.6.8-trisulfonic acid. After formation of the intermediate compound and alkaline solution of the sodium salt from 47.2 parts of the 7.7'-disulfonic acid of 5.5'-dihydroxy-1.1'.2'.2-dinaphthazine is added. It is stirred at 25° C. in the presence of 10% by volume of pyridine until the formation of the dyestuff is completed. The dyestuff is then isolated and if desired purified by reprecipitation. It dissolves in water with a greenish-blue and in concentrated sulfuric acid with a blue-green color.

For conversion into the copper complex 123.2 parts of the dyestuff are dissolved in 2000 parts of water and 20 parts of sodium carbonate. 500 parts of an ammoniacal copper oxide solution containing 50 parts crystallised copper sulfate and 85 parts of concentrated aqueous ammonia are added gradually with stirring at 80–90° C. It is then brought to the boil and boiled with stirring for 20 hours under a reflux. The copper complex thus obtained is separated, filtered and dried. It dyes cotton and regenerated cellulose in bright greenish-blue shades of good fastness to light and to washing.

If instead of 38.4 parts of 1-hydroxynaphthalene-3.6.8-trisulfonic acid there are used 30.4 parts of 1 - hydroxynaphthalene - 3.6 - disulfonic acid, or 30.4 parts of 1-hydroxynaphthalene-3.8-disulfonic acid, or 22.4 parts 1-hydroxynaphthalene-3-sulfonic acid, or 22.4 parts 1-hydroxynaphthalene-4-sulfonic acid, dyestuffs of similar shade and very similar properties are obtained.

If in this example instead of the azine named there is used the same quantity of the 7.7'-disulfonic acid of 5.5'-dihydroxy-1.2.2'.1'-dinaphthazine and the process carried out as given above, a copper complex dyeing cotton in blue-grey shades is obtained.

As the azine used in this example contains two places in the molecule capable of coupling, the dyestuffs described are capable, before or after conversion into the copper compounds, of being combined with a further molecule of a desired diazo compound.

What we claim is:

1. A copper complex compound of a substantive azo dyestuff of the formula

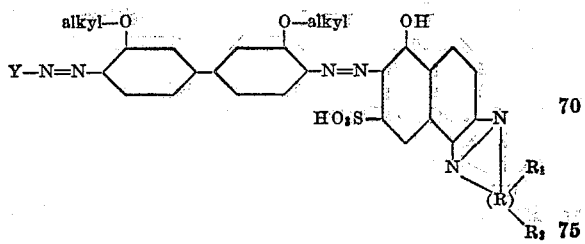

wherein Y stands for a hydroxynaphthalene sulfonic acid radical, R stands for a member of the group consisting of

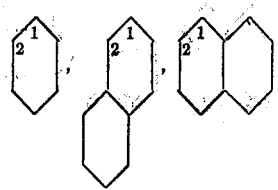

and

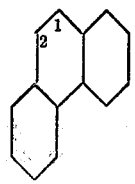

and $R_1$ and $R_2$ each represents a member of the group consisting of hydrogen, hydroxy, methyl, methoxy, ethoxy and carboxy, the grouping

being connected to the remainder of the molecule at the indicated 1- and 2-positions.

2. A copper complex compound according to claim 1, wherein each O-alkyl group is a methoxy group.

3. A copper complex compound of a substantive azo dyestuff of the formula

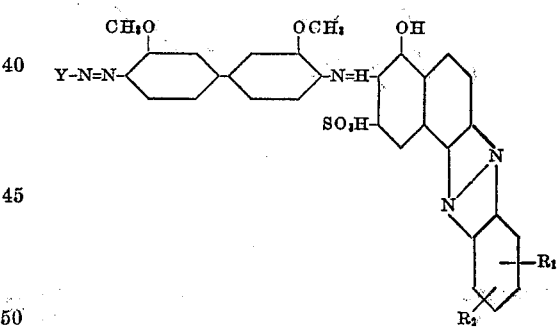

wherein Y stands for the residue of a hydroxynaphthalene sulfonic acid, and $R_1$ and $R_2$ each stands for a member selected from the group consisting of hydrogen, hydroxy, methyl, alkoxy and carboxy.

4. A copper complex compound of a substantive azo dyestuff of the formula

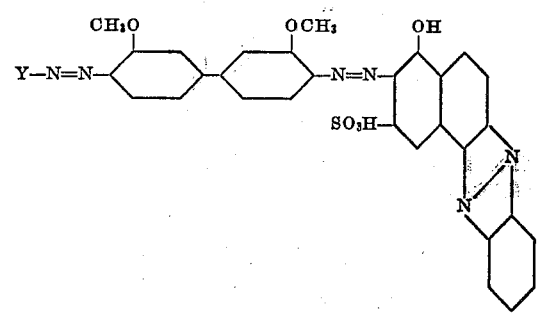

wherein Y stands for the residue of a hydroxynaphthalene sulfonic acid.

5. A copper complex compound of the substantive azo dyestuff of the formula

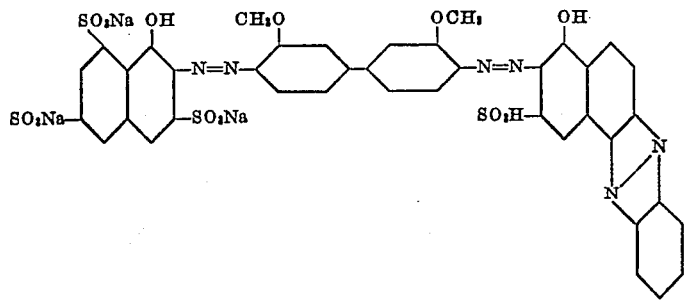

6. A copper complex compound of the substantive azo dyestuff of the formula

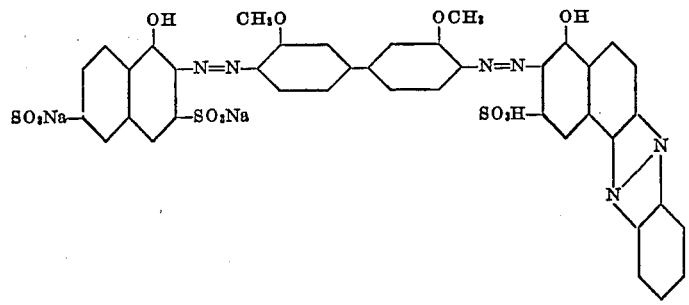

7. A copper complex compound of the substantive azo dyestuff of the formula

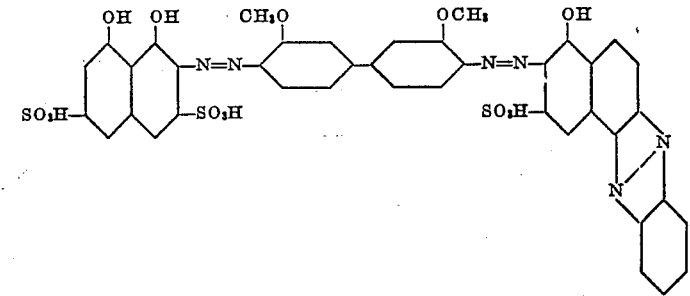

8. A process for the preparation of a copper-containing azo dyestuff, which comprises coupling tetrazotized 3,3'-dialkoxy-4,4'-diaminodiphenyl with an equimolecular amount of a hydroxy naphthalene sulfonic acid and with an equimolecular amount of an azine of the formula

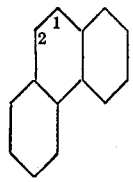

wherein R stands for a member of the group consisting of

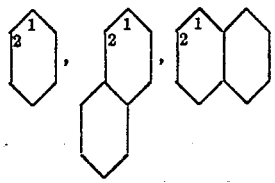

and

and $R_1$ and $R_2$ each represents a member of the group consisting of hydrogen, hydroxy, methyl, methoxy, ethoxy and carboxy, the grouping $$(R)\!\!\begin{array}{c}R_1\\R_2\end{array}$$

being connected to the remainder of the molecule at the indicated 1- and 2-positions, and treating the resultant dyestuff with a copper-yielding agent.

9. A process according to claim 8, wherein the 3- and 3'-alkoxy groups are methoxy groups.

10. A process for the preparation of a copper-containing azo dyestuff, which comprises coupling tetrazotized 3,3'-dimethoxy-4,4'-diaminodiphenyl with an equimolecular amount of a hydroxynaphthalene sulfonic acid and with an equimolecular amount of an azine of the formula

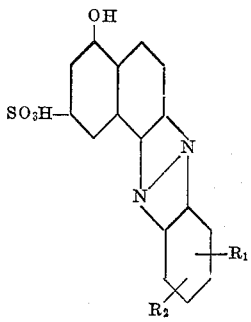

wherein $R_1$ and $R_2$ each stands for a member selected from the group consisting of hydrogen, hydroxy, methyl, alkoxy and carboxy, and treating the resultant dyestuff with a copper-yielding agent.

11. A process for the preparation of a copper-containing azo dyestuff, which comprises coupling tetrazotized 3,3'-dimethoxy-4,4'-diaminodiphenyl with an equimolecular amount of a hydroxynaphthalene sulfonic acid and with an equimolecular amount of an azine of the formula

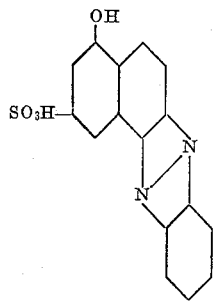

and treating the resultant dyestuff with a copper-yielding agent.

12. A process for the preparation of a copper-containing azo dyestuff, which comprises coupling 3,3'-dimethoxy-4,4'-diaminodiphenyl with an equimolecular amount of 1-hydroxy-naphthalene-3,6,8-trisulfonic acid and with an equimolecular amount of the azine of the formula

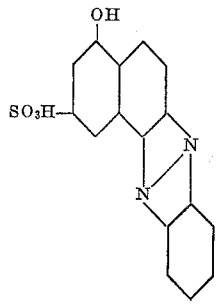

and treating the resultant dyestuff with a copper-yielding agent.

13. A process for the preparation of a copper-containing azo dyestuff, which comprises coupling 3,3'-dimethoxy-4,4'-diaminodiphenyl with an equimolecular amount of 1-hydroxynaphthalene-3,6-disulfonic acid and with an equimolecular amount of the azine of the formula

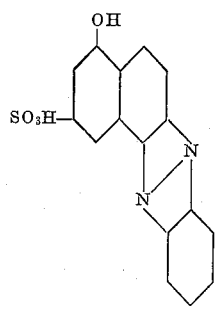

and treating the resultant dyestuff with a copper-yielding agent.

14. A process for the preparation of a copper-containing azo dyestuff, which comprises coupling 3,3'-dimethoxy-4,4'-diaminodiphenyl with an equimolecular amount of 1,8-dihydroxynaphthalene-3,6-disulfonic acid and with an equimolecular amount of the azine of the formula

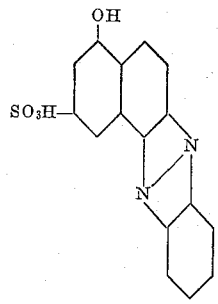

and treating the resultant dyestuff with a copper-yielding agent.

WALTER WEHRLI.
ERNST ISELIN.

REFERENCES CITED

The following references are of record in the file of this patent:

UNITED STATES PATENTS

| Number | Name | Date |
|---|---|---|
| 1,786,272 | Straub et al. | Dec. 23, 1930 |
| 1,877,743 | Straub et al. | Sept. 13, 1932 |
| 2,009,058 | Zitscher | July 23, 1935 |
| 2,390,480 | West | Dec. 4, 1945 |